United States Patent
Wu et al.

(10) Patent No.: US 6,300,422 B1
(45) Date of Patent: Oct. 9, 2001

(54) TRIS(ALKOXYCARBONYLAMINO) TRIAZINE CROSSLINKED WATERBORNE COATING SYSTEM

(75) Inventors: Shaobing Wu, High Point; Frank Chen; Greg Muselman, both of Greensboro, all of NC (US)

(73) Assignee: Lilly Industries, Inc., Indianapolis, IN (US)

( * ) Notice: Subject to any disclaimer, the term of this patent is extended or adjusted under 35 U.S.C. 154(b) by 0 days.

(21) Appl. No.: 09/382,887

(22) Filed: Aug. 25, 1999

(51) Int. Cl.⁷ ................................................ C08F 8/30
(52) U.S. Cl. .................. 525/375; 525/328.8; 525/437; 525/445; 525/453; 525/454
(58) Field of Search ................................ 525/375, 437, 525/443, 453, 454

(56) References Cited

U.S. PATENT DOCUMENTS

| | | |
|---|---|---|
| 4,939,213 | 7/1990 | Jacobs, III et al. . |
| 5,084,541 | 1/1992 | Jacobs, III et al. . |
| 5,891,981 * | 4/1999 | Mauer et al. ................... 525/440 |
| 5,981,080 | 11/1999 | Rockrath et al. . |
| 6,146,707 * | 11/2000 | Sapper et al. ................... 427/409 |

FOREIGN PATENT DOCUMENTS

| | | |
|---|---|---|
| WO 98/27166 | 6/1998 | (WO) . |
| WO 98/44060 | 10/1998 | (WO) . |

* cited by examiner

*Primary Examiner*—Bernard Lipman
(74) *Attorney, Agent, or Firm*—Barnes & Thornburg

(57) ABSTRACT

A thermosetting, one package, waterborne coating composition comprising a hydroxy functional polymer and a tris (alkoxycarbonylamino) is described. The coating composition can optionally include carboxyl-functional resin components and can be clear or pigmented. Preferred embodiments of the present coating compositions include one or more catalysts selected from Brönsted or Lewis acids, tertiary amine bases, ammonium salts of Lewis acids, organo-tin compounds or metal chelating agents.

9 Claims, No Drawings

TRIS(ALKOXYCARBONYLAMINO) TRIAZINE CROSSLINKED WATERBORNE COATING SYSTEM

FIELD OF THE INVENTION

This invention relates to a thermosetting waterborne coating system. More particularly this invention is directed to optionally catalyzed coating systems utilizing hydroxy functional and/or carboxy functional resin binders and a ($C_1$–$C_6$ alkoxy)carbonylamino triazine crosslinker.

BACKGROUND AND SUMMARY OF THE INVENTION

Amino formaldehyde resins are traditional crosslinkers which have been widely used for waterborne or solventborne coatings for nearly half a century. Coatings crosslinked with amino resins provide good cost-performance efficiency. However, these coating systems involve release of formaldehyde and acid-etching problems. With increasing concerns for the environment and public health, other crosslinkers for waterborne coatings have been developed by the coating industry to alleviate these problems. Typical crosslinkers of this type are aziridines, carbodiimides, oxazolines, epoxies, and silanes. However, waterborne coating systems using these compounds as the crosslinkers still present certain problems, including toxicity, short potlife, slow cure speed, or low cost-to-performance efficiency.

Tris(alkoxycarbonylamino) triazines (hereinafter, "TACT") have been reported to be used as crosslinkers for solventborne coatings (WO 98/27166), water reducible coatings, or carboxylic acid functional aqueous coating binders applied as a base coat followed by a clear top coat through a wet-on-wet and then a bake process to develop a clear crosslinked coating (WO 98/44060).

The present invention is directed to a coating composition comprising an aqueous dispersion or solution of a hydroxyl-functional polymer component and a tris (alkoxycarbonylamino) triazine crosslinker. The polymer component(s) can optionally include carboxyl-functionality as well as hydroxyl-functionality. Further, the coating composition may optionally include catalysts, including Lewis or Brönsted acids, latent acid catalysts and tertiary amines, pigments, flow/leveling agents, dispersants, thickness and other rheology modifiers and/or coalescing agents.

DETAILED DESCRIPTION OF THE INVENTION

The present invention provides a formaldehyde-free thermosetting aqueous coating composition comprising a tris (alkyoxycarbonylamino) triazine crosslinking agent and a waterborne hydroxy functional polymer, latex or waterborne solution/dispersion of a hydroxy functional polymer, with optional carboxyl functionality or a mixture of hydroxyl-functional polymers with or without carboxyl functionality. If the coating composition is in the form of a latex, the latex can be non-core/shell, core/shell, inter-penetrating network, or microdomain type.

Any of a wide variety of hydroxyl-functional polymers, such as acrylic, styrene acrylic, vinyl acrylic, polyester, polyether, polyurethane and alkyd resins can be used to formulate the present compositions. The species of hydroxy functional polymer is not critical provided that it is water dispersible (as a latex or in solution) and has a hydroxyl number of about 20 to about 140, more typically about 40 to about 80. By using one or more tris(alkyoxycarbonylamino) triazines as the crosslinker, the coating system can be provided as a thermoset, one-package system, which does not release formaldehyde or other toxic by-products during the thermoset process. The cure rate and other coating/coating composition properties of the coating system can be controlled by varying the concentration of crosslinker, by the nature of the hydroxy functional polymer, by the addition of carboxy functional polymer components, and/or by the addition of catalyst(s). Typically cure temperatures are about 250° F. (with catalyst) to about 425° F. At such temperatures the applied coating compositions cure in about 1 to about 5 minutes.

The use of TACT crosslinkers has been described for use in solventborne, water reducible coatings or carboxylic acid functional aqueous coating binders applied as a base coat followed by a clear top coat through a wet-on-wet/bake process. The present invention is based on Applicant's discovery that TACT compounds can be used effectively in waterborne coating compositions comprising the TACT crosslinker and hydroxyl-functional polymers alone (with or without carboxyl-functionality) or in combination with carboxy-functional film-forming polymers.

The use of the TACT crosslinkers in a water-based system in accordance with this invention allows for the formation of coating compositions that do not release formaldehyde on and do not include high levels of hazardous air polluting solvents (HAPS) or other volatile organic compounds (VOCs). Further, the molecular weight of the hydroxyl-functional polymer used in the coating system can be much higher than those polymers used in the water-miscible or water-reducible solvent systems previously developed. The use of higher molecular weight polymers in the coating composition provides more durable coatings. The weight average molecular weight of the polymer components for use in accordance with this invention can be about $3\times10^3$ to about $2\times10^6$ Daltons.

In formulating the present coating compositions TACT component can be in the form of an emulsion, or it can be blended directly with the aqueous hydroxyl-functional polymer. In one embodiment of the present invention the coating composition is prepared by forming a formaldehyde-free thermosetting aqueous coating composition, using the steps of forming an aqueous emulsion of a ($C_1$–$C_6$ alkoxy) carbonylamino triazine crosslinker containing about 10% to about 60% by weight of the crosslinker, with dispersing agents and optional rheology modifiers, blending said emulsion with an aqueous dispersion or solution of a film-forming resin composition comprising a hydroxyl-functional polymer, so that the resulting coating composition has a total solids content of about 15 to about 70 percent by weight.

Generally, TACT is typically emulsified by dissolving about 30 weight percent to about 55 weight percent of the crosslinker in a minimum amount of an organic solvent and agitating the crosslinker solution with water and a surfactant. A variety of solvents are useful for emulsification of TACT step, including but not limited to alcohols, ethers and esters or mixtures of such solvents. Butanol, dipropylene monomethyl ether, and/or butyl acetate are typically employed. The surfactant component of the TACT emulsion are preferably anionic and/or nonionic surfactants, with nonionic surfactants being most preferred.

The solids content in the present coating composition is typically about 15 to about 60 percent by weight and the present coating compositions are formulated to have a weight ratio of hydroxyl-functional polymer to the ($C_1$–$C_6$ alkoxy)carbonylamino triazine crosslinker of about 10:1 to about 100:1, respectively. In another embodiment of the invention the weight ratio of polymer to TACT is about 20:1 to about 50:1, respectively. In still another embodiment of the invention, the weight ratio of polymer to TACT is about 4:1 to 100:1, more typically, about 6:1 to 50:1.

The nature of the hydroxyl-functional polymer is not critical to the present invention, although the species selected for any given formulation can certainly effect coating cure rates and physical properties. Thus, for example, the hydroxyl-functional polymer can be a hydroxy functional acrylic, styrene acrylic, vinyl acrylic, polyester, polyether, polyurethane and alkyd resin polymers. The hydroxyl-functional polymer may also have some carboxyl-functionality itself or the hydroxy functional polymer component(s) can be blended with acid functional polymers. The polymers of the present invention may be in the form of either an aqueous dispersion or aqueous solution when mixed with the TACT crosslinkers.

The TACT crosslinking reaction during cure of the present compositions can be facilitated or accelerated in the presence of a catalyst. The catalyst can be in the form of Lewis acids, Brönsted acids such as organic acids, organo-tin compounds, tertiary amines, or ammonium or amine salts of sulfonic acids, for example, ammonium toluene sulfonate, in an amount effective to catalyze the reaction between the hydroxyl-functional polymer and the alkoxycarbonylamino triazine crosslinker. When such catalysts are present, exposure of the coating composition to elevated temperatures (>250°) effects complete cure within 3 to 5 minutes. The use of effective amounts of one or more catalysts accelerates crosslinking of the coating composition and/or promotes crosslinking of the coating at lower temperature than required in the absence of catalyst. Thus, in formulation the present coating compositions TACT component can be in the form of an emulsion, or it can be blended directly with the aqueous hydroxyl-functional polymer. Specific examples of catalysts useful in the present invention are p-toluene sulfonic acid, organo-titanate esters and triethylamine.

The present coating composition can also be formulated to contain effective amounts of art-recognized flow/leveling agents, dispersants, thickeners and other rheology modifiers, coalescing agents, and pigments, dyes and/or colorants as desired to meet the specific performance needs.

Any of the various flow/leveling agents, dispersants, thickeners and rheology modifiers as standard in the art may be used as optional components within the scope of the present invention.

EXAMPLES AND DISCUSSION OF VARIOUS EMBODIMENTS OF THE PRESENT INVENTION

Clear Coating Formulations—TACT Crosslinker Added in a Form of Emulsion Emulsification of TACT Crosslinker Generally, to form a TACT emulsion, a tris (alkyoxycarbonylamino) triazine or a mixture of tris (alkyoxycarbonylamino) triazines were dissolved in an alcohol (butanol) or a mixture of organic solvent(s) to form a TACT solution. The solids of the solution varied from 5–60 weight percent, with the range of 30–55 weight percent preferred. The solution of TACT was gradually added into deionized water and one or more surfactants with vigorous stirring to a range of 30–70 weight percent, with a preferred range of 40–60 weight percent. The surfactants were typically anionic and/or nonionic surfactants added at 0.2–8 weight percent, more typically about 0.5–3 weight percent. Nonionic surfactants were preferred.

Preparation: TACT Emulsion

A stable TACT emulsion was afforded when 50 g TACT was added into a mixture of water solution (48 g deionized water, 0.1 g a petroleum oil-type defoamer, and 1.9 g an allyloxypolyglycol ether alcohol) with vigorous agitation. The TACT emulsion can be thickened with an alkali-soluble or swellable thickener or an associative thickener. A stable viscous emulsified TACT from 15 to 40 seconds (Ford cup #4) was provided when 0.8–3 g ammonia-soluble acrylic emulsion or 0.3–1 g hydrophobic modified urethane associative thickener was added into 100 g emulsified TACT.

Coating Formulation With TACT Emulsion But Without Addition of a Catalyst

Clear base coatings are formulated with 10–90 weight percent of any hydroxyl functional latexes (solids ranging from 20–60 weight percent, preferably 30–50 weight percent) with hydroxyl number from 10 to 140 mg KOH/g solid resin, with a preferred range of 40–80 mg KOH/g solid resin, 0.3–25 weight percent TACT crosslinker, 0–20 weight percent coalescing agents, and 0–8 weight percent flow/wetting agents. The hydroxyl-functional latexes can be chosen from any type of hydroxyl functional latexes, hydroxyl- and carboxyl-functional latexes, or core/shell hydroxyl-functional latexes. Coalescing agents can be chosen from water-soluble, water miscible, and/or water insoluble acetate esters, and/or ethylene and/or propylene type ethers. Flow/wetting agents can be chosen from alcohol, amide, ether, or siloxane compounds, with alcohol, ether, and/or siloxane compounds being preferred.

EXAMPLES (Formulations 1–4)

Clear base coatings were formulated with 14 g TACT emulsion (above) and 100 g hydroxyl-functional acrylic latex (hydroxyl number 40, Formulation 1), 100 g hydroxyl- and carboxyl-functional acrylic latex (hydroxyl number 30, carboxyl number 20, Formulation 2), 100 g acrylic amide modified hydroxyl acrylic latex (hydroxyl number 30, carboxyl number 20, Formulation 3), or 100 g core/shell acrylic type latex (the core consisted of allyl methacrylate as internal crosslinker, and the shell contained hydroxyl groups, Formulation 4). The coatings were cast on Leneta paper and cured at 250° F. for 7 minutes. The MEK double rubs and hot block resistance were significantly increased after the crosslinking (Table 1),

TABLE 1

MEK Double Rubs and Hot Block Resistance of Clear Base Coating Formulations

| Coating Formulation | MEK Double Rubs | | Hot Block Resistance | |
| --- | --- | --- | --- | --- |
| | Without the crosslinker | With the crosslinker | Without the crosslinker | With the crosslinker |
| Formulation 1 | 16 | 70 | Not separated | separated |
| Formulation 2 | 15 | 86 | Not separated | separated |
| Formulation 3 | 31 | 118 | Not separated | separated |
| Formulation 4 | 20 | 94 | Not separated | separated |

Coating Formulations with TACT Emulsion and Addition of a Catalyst

The crosslinking of hydroxyl-functional latexes with TACT was catalyzed with addition of an acid catalyst (Brönsted acids or Lewis acids) or a basic catalyst. The acid catalysts were sulfonic acids, phosphonic acids, carboxylic acids, or organo tin compounds. Preferred acid catalysts were organo-sulfonic acids or phosphonic acids. Basic catalysts were chosen from amines. Tertiary amines were preferred. Thermally labile latent acid catalysts, such as ammonium salts of Lewis acid catalysts are also employed. Catalysts were added in a range of 0–5 weight percent, with a range of 0.2–1.5 weight percent preferred.

The crosslinking of hydroxyl-functional latexes with TACT was also accelerated by addition of 0–5 wt %, preferred 0.3–1.6 wt %, metal chelating agents. Preferred metal chelating agents were zinc, aluminum, zirconium, and titanium chelating compounds.

EXAMPLES (Formulation 5–7)

Catalyzed clear base coatings were formulated with 100 g hydroxyl and carboxyl functional acrylic latex (hydroxyl number 30, carboxyl number 20) and 7 g TACT emulsion with addition of 0.5 g solid-based p-toluene sulfonic acid (Formulation 5), organo-titanate ester (Formulation 6), or triethylamine (Formulation 7). The coatings were cured at 300° F. for 4 minutes. The MEK double rubs were improved after the addition of the catalysts (Table 2).

TABLE 2

Catalyst Effect on the MEK Double Rubs of the Clear Base Coatings

| Coating Formulation | MEK Double Rubs | |
|---|---|---|
| | Without the catalyst | With the catalyst |
| Formulation 5 | 33 | 45 |
| Formulation 6 | 33 | 56 |
| Formulation 7 | 33 | 55 |

TACT Crosslinker Added to Aqueous Hydroxyl-Functional Polymer Directly

The TACT crosslinker solution can be added directly and dispersed into a hydroxyl-functional latex forming a one-package, thermoset base coating system. With gentle stirring, the required amount of TACT crosslinker solution was dropwise added into the latex in 10–50 min. After completion of the TACT addition, 10–30 min of gentle stirring was allowed to achieve equilibrium of the system.

EXAMPLES (Formulations 8 and 9)

The TACT crosslinker solution (3.5 or 7 g) was slowly added with gentle stirring into a 100 g acrylate amide-modified hydroxyl acrylic latex (hydroxyl number 30, carboxyl number 20, Formulation 8 and 9, respectively) in 15 min. The coatings were cast on Leneta paper and cured at 250° F. for 7 minutes. As with the coating formulations produced with a TACT emulsion, the MEK double rubs of the formulations wherein TACT was added directly were increased after the crosslinking (Table 3).

TABLE 3

MEK Double Rubs and Hot Block Resistance of the Coating Formulations by Direct Addition of the TACT Crosslinker

| Coating Formulation | Cross-linker Level, g | MEK Double Rubs | | Hot Block Resistance | |
|---|---|---|---|---|---|
| | | Without the crosslinker | With the crosslinker | Without the crosslinker | With the crosslinker |
| Formulation 3 | 14 g Emulsion | 31 | 118 | Not separated | separated |
| Formulation 8 | 3.5 g TACT | 31 | 52 | Not separated | separated |
| Formulation 9 | 7.0 g TACT | 31 | 112 | Not separated | separated |

Pigmented Coating Formulations

Generally, the TACT crosslinked pigmented coatings can be formulated with 8–60 weight percent (15–40 weight percent preferred) hydroxyl-functional latex(s); 0–10 weight percent (0–5 weight percent preferred) coalescing agents; 0-10 weight percent (0–5 weight percent preferred) mineral spirits; 0.1–20 weight percent (0.5–10 weight percent preferred) TACT solution or 0.2–40 weight percent (0.5–20 weight percent preferred) TACT emulsion crosslinker; 0–5 weight percent acid, base catalyst, or metal chelating agent 0–4 weight percent thickener (associative and/or polycarboxylic acid type thickeners were preferred); 3–55 weight percent (8–25 weight percent preferred) Titanium dioxide; 3–55 weight percent (8–25 weight percent preferred) inert pigments; 0.2–10 weight percent (1.2–4 weight percent preferred) pigment wetting agent(s); 0–3 weight percent (0.3–0.9 weight percent preferred) defoamer(s); 0–10 weight percent (3–5 weight percent preferred) substrate flow/wetting agent(s); 5–50 weight percent (10–40 weight percent preferred) water. The PVC of the coating formulations was 5–85%, preferred 15–60%; the solids content was 10–85 weight percent, preferred 30–65%; and pH of the formulations was 1–12, preferred 4–10.

EXAMPLE (Formulation 10)

A thermoset one-package low pigmented coating formulation was obtained using TACT solution as the crosslinker. A pigmented slurry for the coating was obtained by grinding a mixture of water (30 weight percent), poly(carboxylic acid) type dispersant (0.7 weight percent), nonionic surfactants (0.6 weight percent), rutile $TiO_2$ (1 wt 0/6), silica (8 weight percent), defoamer (0.2 weight percent). A letdown for the coating contained a hydroxyl-functional acrylic latex (hydroxyl number 40 and carboxyl number 20, 35 weight percent), TACT solution (5.0 weight percent), propylene acetate (0.3 weight percent), Texanol alcohol (0.5 weight percent), polyether modified polydimethyl siloxane (0.4 weight percent), dimethyl ethanol amine (0.7 weight percent), and water as needed. The pH and viscosity of the formulation was finally adjusted to 9 and 60–65 KU using ammonia and a thickener, respectively. The coating formulation was drawn down on Leneta paper (1.5 mil) or sprayed on polywood board and cured at 250° F. for 7–30 minutes. After the cure, the coating showed 85 MEK double rubs, and also exhibited excellent adhesion and hot block resistance.

EXAMPLE (Formulation 11)

A thermoset one-package white pigmented base coating formulation was obtained using emulsified TACT as the crosslinker. A pigmented slurry for the coating was obtained by grinding a mixture of water (22 weight percent), nonionic surfactants (2–5 weight percent), rutile $TiO_2$ (8 weight percent), clay (10 weight percent), silica (5 weight percent), defoamer (0.4 weight percent). A letdown for the coating comprised of a hydroxyl-functional acrylic latex (hydroxyl number 45 and carboxyl number 30, 30 weight percent), emulsified TACT solution (9.0 weight percent), mineral spirits (0.1 weight percent), hexyl ethylene glycol ether alcohol (0.4 weight percent), polyether modified polydimethyl siloxane (0.4 weight percent), toluene sulfonic acid (0.7 weight percent), and water as needed. The pH and viscosity of the formulation was finally adjusted to 3–4 and 65–70 KU using ammonia and a urethane thickener, respectively. The coating formulation was sprayed on wood (2–3 mils) and cured at 270° F. for 15 minutes. After the cure, the coating passed roller tape adhesion and wet-block resistance tests.

EXAMPLE (Formulation 12)

A thermoset one-package white pigmented coating formulation was obtained using emulsified TACT as the crosslinker. A pigmented slurry for the coating was obtained by grinding a mixture of water (20 weight percent), poly(carboxylic acid) type dispersant (1 weight percent), nonionic surfactants (0.6 weight percent), rutile $TiO_2$ (15 weight percent), white clay (10 weight percent), calcium carbonate (10 weight percent), silica (10 weight percent), defoamer (0.5 weight percent). A letdown for the coating contained a hydroxyl-functional acrylic latex (hydroxyl number 50 arid carboxyl number 40, 28 weight percent), TACT (5.0 weight percent), mineral spirits (0.1 weight percent), hexyl ethylene glycol ether alcohol (1 weight percent), dipropylene ether (0.5 weight percent), polyether modified polydimethyl siloxane (0.3 weight percent), tertiary amine (0.7 weight percent), metal chelating agent (1 weight percent), and water as needed. The pH and viscosity of the formulation was finally adjusted to 9–10 and 70–75 KU using ammonia and a thickener, respectively. The coating formulation was sprayed on wood (2 mils) and cured at 350° F. for 3 minutes. After cure, the coating exhibited good hiding, re-coatability, water resistance, excellent adhesion, and wet-block resistance.

STABILITY OF THE COATING COMPOSITION

The clear base coating formulations were stored in a 120° F. oven for three weeks. No gelation or significant viscosity increase were observed after the test. MEK double rubs also showed the coating system was stable as a one package system. For a pigmented coating formulation using TACT as the crosslinker, no separation was observed for a month and the coating system did not lose any significant curing property over that time.

We claim:

1. A formaldehyde-free thermosetting aqueous coating composition, said composition comprising an aqueous dispersion or solution of a film-forming resin composition comprising a hydroxyl-functional polymer and an optionally pre-emulsified aqueous ($C_1$–$C_6$ alkoxy)carbonylamino triazine crosslinker, said composition having a solids content of about 15 to about 60 percent by weight and wherein the ratio of hydroxyl-functional polymer to crosslinker is about 4:1 to about 100:1.

2. The coating composition of claim 1 wherein the ratio of hydroxyl-functional polymer to crosslinker is about 6:1 to 50:1.

3. The coating composition of claim 1 wherein the hydroxyl-functional polymer has a molecular weight of about $3 \times 10^3$ to about $2 \times 10^6$ Daltons.

4. The coating composition of claim 1 further comprising a catalyst selected from the group consisting of Brönsted acids, Lewis acids, tin salts and tertiary amines in an amount effective to catalyze the reaction between the hydroxyl-functional polymer and the ($C_1$–$C_6$ alkoxy)carbonylamino triazine crosslinker at elevated temperature.

5. The coating composition of claim 1 wherein the hydroxyl-functional polymer is selected from the group consisting of acrylic, styrene acrylic, vinyl acrylic, polyester, polyether, polyurethane and alkyd resins having a hydroxyl number of about 20 to about 140.

6. The coating composition of claim 5 wherein the hydroxyl-functional polymer is also carboxyl-functional.

7. The coating composition of claim 4 wherein the catalyst is selected from the group consisting of Brönsted acids, Lewis acids, tin salts and tertiary amines.

8. The coating composition of claim 4 wherein the catalyst is selected from the group consisting of toluene sulfonic acid, the ammonium salt of toluene sulfonic acid, organotitanate ester and a $C_3$–$C_{14}$ tertiary amine.

9. The coating composition of claim 1 wherein the coating composition further comprises an additive selected from the group consisting of pigments, dyes, flow/leveling agents, dispersants, thickeners and other rheology modifiers and coalescing agents.

* * * * *